US 8,533,761 B1

(12) United States Patent
Sahami et al.

(10) Patent No.: US 8,533,761 B1
(45) Date of Patent: Sep. 10, 2013

(54) AGGREGATING MEDIA INFORMATION

(75) Inventors: Mehran Sahami, Palo Alto, CA (US); Richard C. Gossweiler, III, Sunnyvale, CA (US); John Blackburn, Newcastle, WA (US); Manish G. Patel, Mountain View, CA (US); David A. Brown, Mountain View, CA (US); Neha Gupta, San Jose, CA (US); Thomas H. Taylor, Redmond, WA (US)

(73) Assignee: Google Inc., Mountain View, CA (US)

( * ) Notice: Subject to any disclaimer, the term of this patent is extended or adjusted under 35 U.S.C. 154(b) by 895 days.

(21) Appl. No.: 11/742,148

(22) Filed: Apr. 30, 2007

(51) Int. Cl.
*G06F 3/00* (2006.01)
*G06F 13/00* (2006.01)
*H04N 5/445* (2011.01)

(52) U.S. Cl.
USPC .............................................. 725/53; 725/51

(58) Field of Classification Search
USPC .................................................... 725/51, 53
See application file for complete search history.

(56) References Cited

U.S. PATENT DOCUMENTS

| | | | |
|---|---|---|---|
| 4,963,995 A | 10/1990 | Lang | |
| 5,010,499 A | 4/1991 | Yee | |
| 5,121,476 A | 6/1992 | Yee | |
| 5,589,892 A | 12/1996 | Knee et al. | |
| 5,629,733 A | 5/1997 | Youman et al. | |
| 5,793,438 A | 8/1998 | Bedard | |
| 5,801,787 A | 9/1998 | Schein et al. | |
| 5,805,235 A | 9/1998 | Bedard | |
| 5,808,694 A | 9/1998 | Usui et al. | |
| 5,880,768 A | 3/1999 | Lammons et al. | |
| 5,903,816 A | 5/1999 | Broadwin et al. | |
| 5,940,073 A | 8/1999 | Klosterman et al. | |
| 6,002,394 A | 12/1999 | Schein et al. | |
| 6,005,562 A | 12/1999 | Shiga et al. | |
| 6,005,565 A | 12/1999 | Legall et al. | |
| 6,014,184 A | 1/2000 | Knee et al. | |
| 6,014,502 A | 1/2000 | Moraes | |
| 6,147,715 A | 11/2000 | Yuen et al. | |
| 6,216,264 B1 | 4/2001 | Maze et al. | |
| 6,233,389 B1 | 5/2001 | Barton et al. | |
| 6,263,501 B1 | 7/2001 | Schein et al. | |
| 6,268,849 B1 | 7/2001 | Boyer et al. | |
| 6,373,528 B1 | 4/2002 | Bennington et al. | |
| 6,483,548 B1 | 11/2002 | Allport | |
| 6,493,878 B1 | 12/2002 | Kassatly | |
| 6,505,348 B1 | 1/2003 | Knowles et al. | |
| 6,640,337 B1 | 10/2003 | Lu | |

(Continued)

FOREIGN PATENT DOCUMENTS

KR 10-2007-0027143 3/2007

OTHER PUBLICATIONS

"Build a Google IG like AJAX Start Page In 7 days using Asp.Net AJAX and .Net 3.0." Al Zabir, Omar. http://www.codeproject.com/KB/ajax/MakingGoogleIG.aspx. Jan. 3, 2007. Accessed May 22, 2010.*

(Continued)

*Primary Examiner* — Bennett Ingvoldstad
(74) *Attorney, Agent, or Firm* — Fish & Richardson P.C.

(57) ABSTRACT

A computer-implemented method includes receiving a search request associated with media-related information, identifying a media-related object responsive to the request, and gathering from a plurality of different corpuses of information a plurality of search results associated with the media-related object.

15 Claims, 11 Drawing Sheets

(56) References Cited

U.S. PATENT DOCUMENTS

| | | |
|---|---|---|
| 6,769,128 B1 | 7/2004 | Knee et al. |
| 7,065,709 B2 * | 6/2006 | Ellis et al. .................... 715/719 |
| 7,328,450 B2 | 2/2008 | Macrae et al. |
| 7,493,015 B1 | 2/2009 | Van Stam et al. |
| 7,606,925 B2 | 10/2009 | Sheldon |
| 7,627,882 B2 | 12/2009 | Finseth et al. |
| 7,685,619 B1 | 3/2010 | Herz |
| 7,734,680 B1 | 6/2010 | Kurapati et al. |
| 2001/0001160 A1 * | 5/2001 | Shoff et al. .................... 725/51 |
| 2002/0083451 A1 | 6/2002 | Gill et al. |
| 2002/0133821 A1 | 9/2002 | Shteyn |
| 2003/0070171 A1 | 4/2003 | Jeon et al. |
| 2003/0110503 A1 | 6/2003 | Perkes |
| 2003/0126600 A1 | 7/2003 | Heuvelman |
| 2003/0226147 A1 * | 12/2003 | Richmond et al. ............. 725/51 |
| 2004/0073922 A1 | 4/2004 | True |
| 2004/0078816 A1 | 4/2004 | Johnson |
| 2004/0088328 A1 | 5/2004 | Cook et al. |
| 2004/0194141 A1 | 9/2004 | Sanders |
| 2005/0102704 A1 | 5/2005 | Prokupets et al. |
| 2006/0130093 A1 | 6/2006 | Feng et al. |
| 2006/0195447 A1 | 8/2006 | Chang |
| 2007/0214131 A1 | 9/2007 | Cucerzan et al. |
| 2007/0214480 A1 * | 9/2007 | Kamen ........................... 725/53 |
| 2008/0063381 A1 * | 3/2008 | Conroy et al. ................. 725/61 |
| 2008/0270449 A1 | 10/2008 | Gossweiler et al. |
| 2008/0270886 A1 | 10/2008 | Gossweiler et al. |
| 2008/0271078 A1 | 10/2008 | Gossweiler et al. |
| 2008/0271080 A1 | 10/2008 | Gossweiler et al. |
| 2009/0055385 A1 | 2/2009 | Jeon et al. |

OTHER PUBLICATIONS

Sahami, M., et al., "A Web-based Kernel Function for Measuring the Similarity of Short Text Snippets", Proceeding of the 15th International Conference on World Wide Web (WWW 2006), May 23-26, 2006, Edinburgh, Scotland, pp. 377-386.

International Preliminary Report on Patentability, International Application No. PCT/US2008/062075, dated Nov. 12, 2009, 6 pages.

International Search Report and Written Opinion for International Application No. PCT/US2008/062075, dated Oct. 21, 2008, 10 pages.

* cited by examiner

AGGREGATING MEDIA INFORMATION

TECHNICAL FIELD

This document discusses electronic programming guides and presentation of media information, such as information about television programs and actors, from multiple distinct data sources.

BACKGROUND

People have a great interest in entertainment media programming such as television programming and movies. New forms of programming that can be referenced as television programming have also appeared in the form of videos, whether downloadable or streaming, from services such as YouTube. Generally, users watch programming in a fairly hit-or-miss style, such as by channel surfing, conducting basic searches on various videos, or reviewing various "favorites" lists of videos. In channel surfing, a user generally learns only what they can see in a small summary box (where they have digital media delivery such as DirectTV or digital cable) and what they can discern from watching the program for a time. In conducting searches, the users see various general search results, such as from a search against the web or against a database of videos (e.g., the YouTube database).

SUMMARY

This document describes mechanisms and techniques that may be employed to assist users in finding media programming in which they may have an interest, and that can provide additional information about, or access to, that programming. Generally, the mechanisms and techniques permit for searching for media information, such as by entering a title for a program or movie, or the name of an actor, producer, or director. Search results may be presented in various forms, such as in a display that aggregates search results form multiple different information sources. The sources can provide information such as images associated with a program, structured data about a program (such as a program title, list of actors, etc.), schedule information about upcoming showings of the program, web search results, and other pieces of information.

In one implementation, a computer-implemented method is disclosed. The method includes receiving a search request associated with media-related information, identifying a media-related object responsive to the request, and gathering from a plurality of different corpuses of information a plurality of search results associated with the media-related object. The media-related object may comprise a television program. The method may also include generating mark up code for displaying the plurality of search results in the form of an upcoming episode listing for the program, and an overview of the program. The search request can be received from a user selection of a link associated with the media-related object.

In some aspects, the plurality of different corpuses include a structured corpus and an unstructured corpus. Also, the structured corpus can include information about a plurality of televisions programs or movies, and the unstructured corpus can include web content. The method may also include determining that the search request is associated with media-related information. In addition, the method can include generating code for displaying results from each of the plurality of different corpuses in a distinct area of a display. Moreover, the method can additionally include receiving one or more user commands to move a display of a group of search results, and generating code for displaying the display of the group of search results in an area indicated by the user commands.

In another implementation, a computer-implemented method is disclosed, and comprises receiving a search request associated with a media program, submitting a query that corresponds to the search request to one or more search engines addressing a plurality of search corpuses containing media-related information, and receiving a plurality of results in response, and aggregating the results from the plurality of corpuses for simultaneous display in adjacent areas of a visual display. The query can include the search request. In addition, the method can also include appending a media indicating term to the search request to form the query. Aggregating the results from the plurality of corpuses can also comprise identifying areas in a user-configured display for each of the results and generating code for creating a display of the results in the areas.

In certain aspects, aggregating the results from the plurality of corpuses comprises associating an upcoming episode list of results with a first display area, a program summary with a second display area, and additional search results with one or more other display areas. Also, the method may further comprise providing for a display of a program summary area, an images search result area, a web search result area, and an episode guide area.

In yet another implementation, a computer-implemented system is disclosed. The system includes a plurality of separate databases each containing media-related information, a search engine configured to receive a request and generate one or more media-related queries to the plurality of separate databases, and a page formatter including a search result aggregator for generating information for a display of multiple groups of search results from the plurality of separate databases. The request can include a media program name. Also, the page formatter may generate mark up code for displaying the plurality of search results in the form of an upcoming episode listing for the program, and an overview of the program.

In some aspects, the plurality of different corpuses can include a structured corpus and an unstructured corpus. Moreover, the structured corpus can include information about a plurality of televisions programs or movies, and the unstructured corpus can include web content.

The details of one or more embodiments are set forth in the accompanying drawings and the description below. Other features, objects, and advantages will be apparent from the description and drawings, and from the claims.

DETAILED DESCRIPTION

Figure 1:
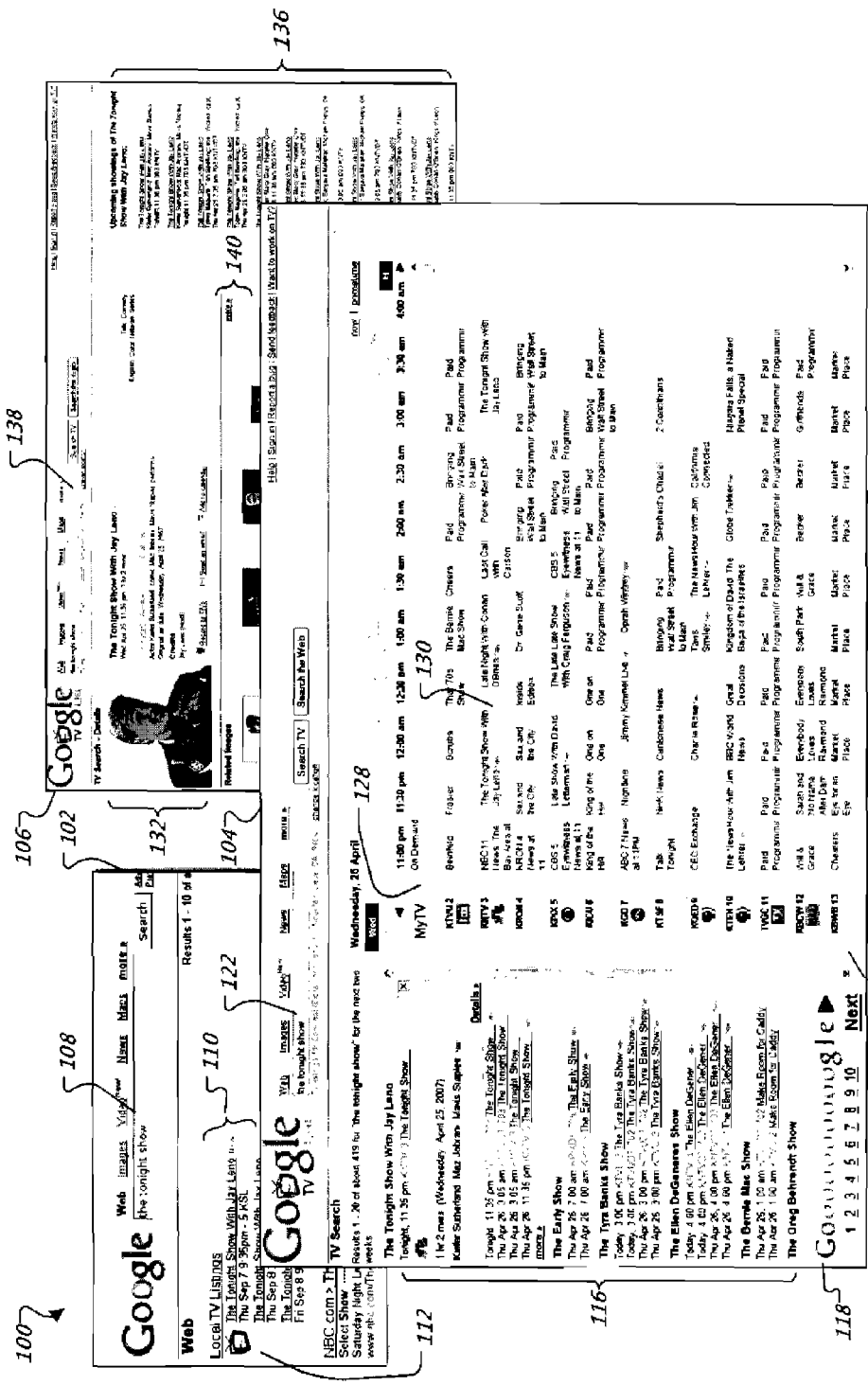
FIG. 1 shows displays illustrating interactions provided by an example program guide system.
Figure 1A:
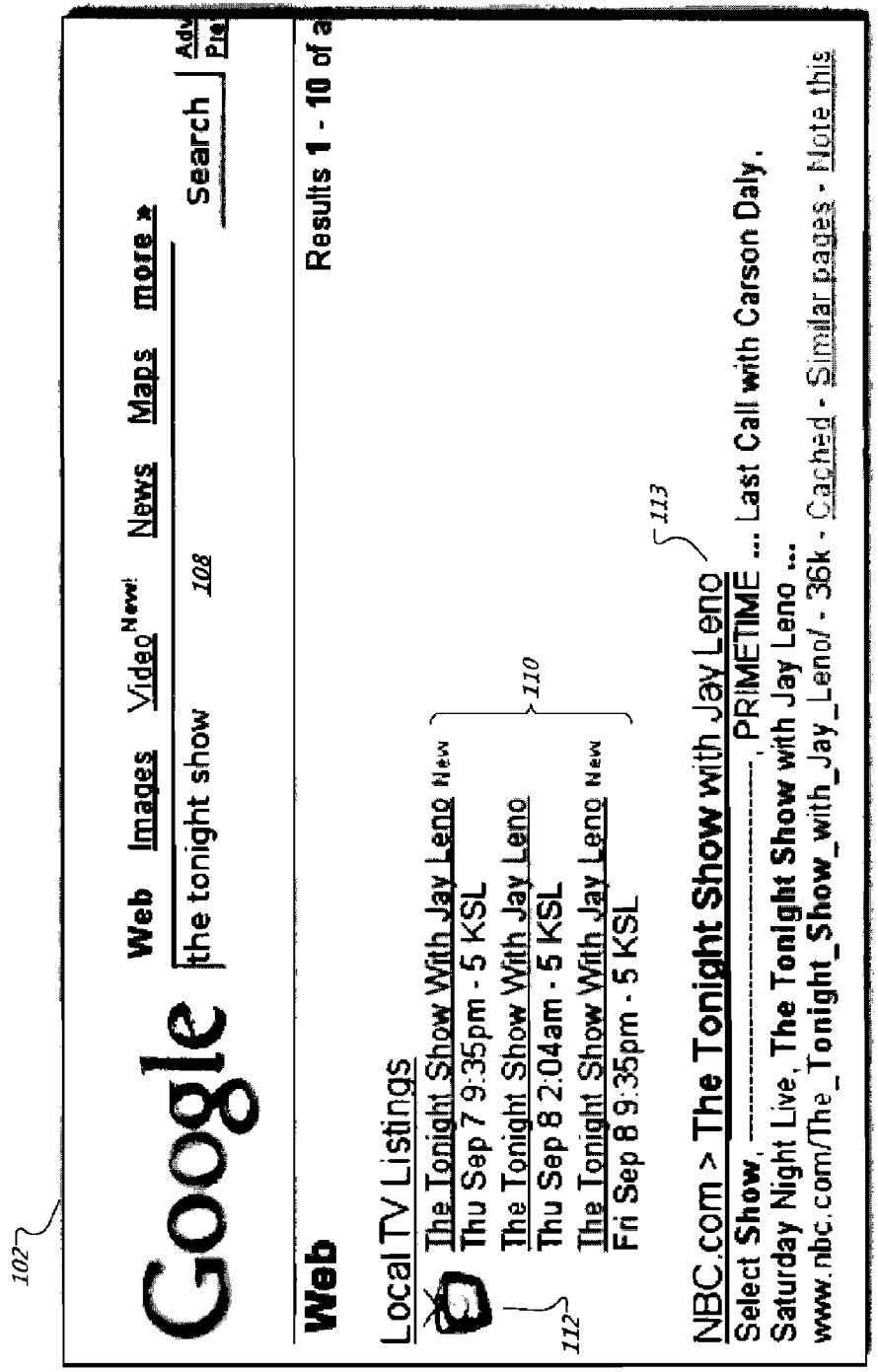
FIGS. 1A-1C show particular displays from FIG. 1.
Figure 1B:
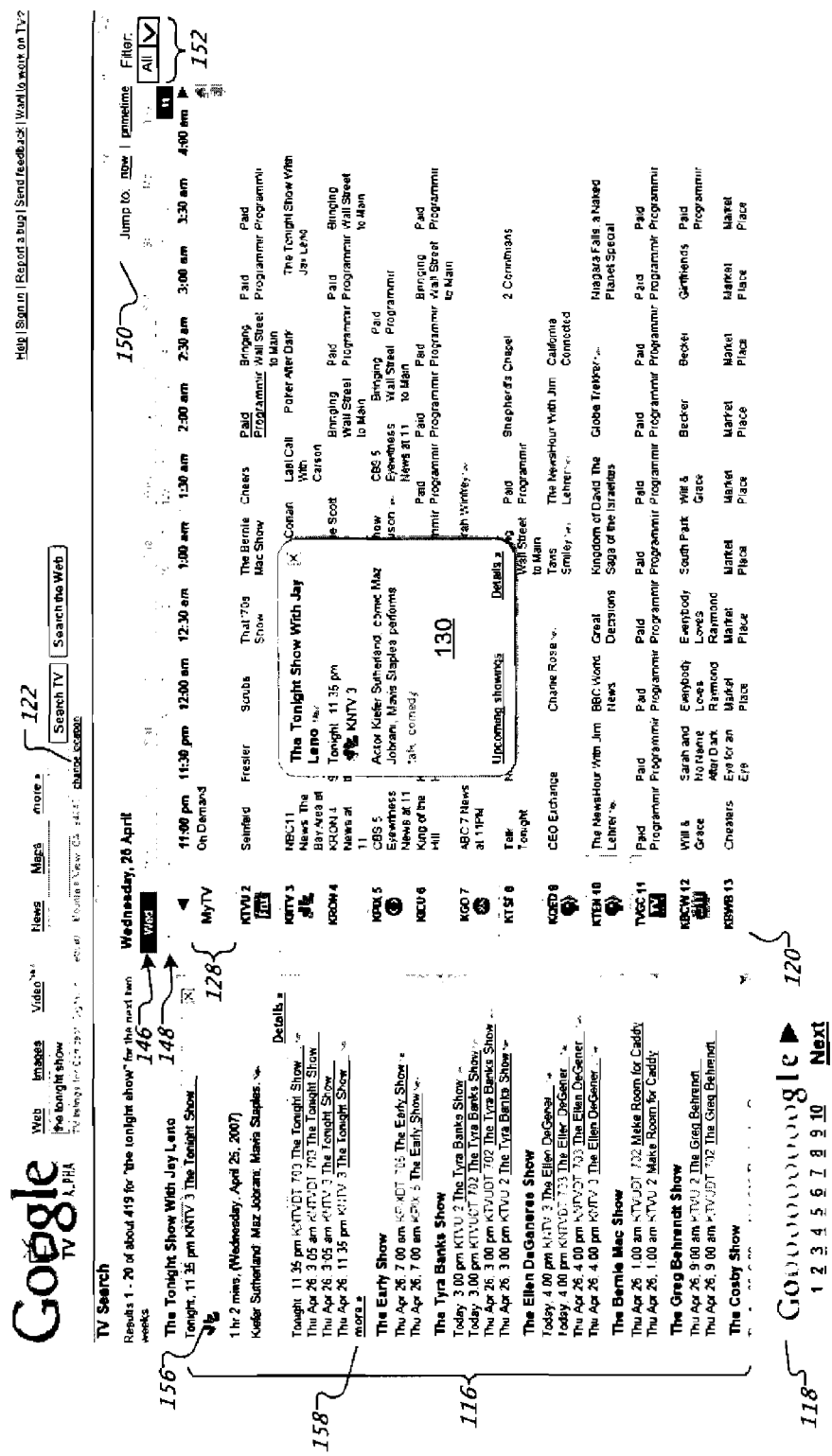
Figure 1C:
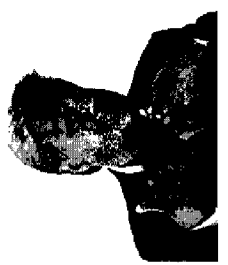

FIG. 1 shows displays illustrating interactions provided by an example program guide system 100, and FIGS. 1A, 1B, and 1C show particular displays from FIG. 1. In general, the program guide system 100 allows a user to search for media programming (e.g., broadcast television, cable television, satellite television, broadcast radio, satellite radio, and Internet media) by making a search request using a search page 102. The program guide system 100 presents, on the search page 102 and/or on a landing page 104, search results that are based on the search request.

The search results include a list of one or more collections of programs related to the search request—grouped by episodes of a program. An episode as used here can include a particular showing in a series of showings (such as an episode of a sitcom), or may include a single episode of a program (such as a movie or a discrete on-line video). The search results also include a program schedule grid 120 that displays a list of channels and program episodes presented by each of the channels for a particular time period. At least one of the program episodes in the schedule grid relates to the search request made by the user. In response to a user selection of a program in the schedule grid or the list, the program guide system 100 presents detailed information associated with the program in a details page 106.

In more detail, the search page 102 includes a search box 108 where a user may input a search term, such as a portion of a television program name. The search page 102 presents preliminary search results based on the search term input. The preliminary search results may include, for example, a list of web pages having information related to the search term. In addition, the preliminary search results may include a list 110 of media programming related to the search term. The media programming list 110 may include text, such as "Local TV Listings," that identifies items in the list 110 as media programming as apposed to web page items. The media programming list 110 also includes one or more media icons 112 that indicate the types of media programming presented in the list 110, e.g., a television, radio, or webcast icon.

Where the system is able to determine that a search request was likely media-related, it can group the media results in a manner that differs from an ordinary list of search results. Specifically, as shown, each of the listings on search page 102 is shown with a title, time, and channel, whereas standard search results may be shown with a title, snippet, and URL. This special formatting of a search result may be referred to as a "one box." Other search results, such as weather, location, and similar results may also be presented in a specially-formatted one box.

The program guide system 100 may present a landing page 104 in response to a user selection of an item in the list 110. The landing page 104 includes media result groupings 116. The groupings 116 list one or more collections of programs related to the search term. The groupings 116 group collections of programs, for example, by program name with each item in a grouping being a particular episode or airing of the program. Alternatively, the groupings 116 may be grouped using another parameter, such as grouping by the media channel presenting the programs, a genre of the programs, or the time of day the programs are presented. An additional results control 118 allows a user to navigate to other groupings that are not currently displayed, and that may be groupings considered to be less responsive to the user's request.

Each of the groupings 116 may also include a "more" control 158 that lists additional results within the particular grouping. In the pictured example, the three next-pending programs are shown for the media grouping associated with the television program "The Tonight Show", and a user can select the "more" control 158 to show addition programs further in the future. Such a selection may cause the Tonight Show grouping to expand and may also cause the other groupings to be removed to make room for the expanded grouping.

The groupings can also include an "Add to my TV" control that, when selected, can add a particular program (such as a series of episodes) or episode to a personalized program guide for the user. For example, a "My TV" channel may be maintained for a user, as described below, and an episode or all the episodes of a program may be added to that channel when the "Add to my TV" control is selected.

The landing page 104 also includes a schedule grid 120. The schedule grid 120 is displayed adjacent to and side-by-side with the groupings 116. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the list 110 and the groupings 116. Where the user is a user registered with the system 100, the user's default location may be used to generate programming suggestions.

The schedule grid 120 presents media programming for a particular time range on a particular date, such as over several hours. A user may select the date using a calendar control 146. The calendar control 146 may default to a particular date, such as the current date. When a search is performed, the grid 120 may default to the area surrounding the time and channel of the episode determined to be a best search result. Selection of other episodes in the groupings 116 may cause the grid to move automatically to display programs around the selected episode (or the first-returned episode for a particular grouping, if a grouping is selected).

The schedule grid 120 presents a list of media channels vertically along its left side and times of day horizontally along its top side in a time bar 148. The programs or episodes for a particular channel are presented in the channel's row and in a column having a time division closest to the actual time that the program is presented by its associated channel. The channels may be associated with a particular numerical channel for a broadcast, or may be a virtual channel such as a personalized channel or a stream of information over the internet.

The schedule grid 120 also includes a personalized channel 128, termed here as "My TV." The personalized channel 128 includes controls that allow a user to create a virtual channel using content from actual channels or another personalized channel, such as the personalized channel of another user. A user may select a program in the schedule grid 120. Episodes or programs may be added to the personalized channel 128 in a variety of ways. For example, one user may send a message to another user that identifies a particular program, such as by supplying a URL to a video or through another accepted mechanism. A user may also choose to drag a program or episode from an area such as part of the programming grid 120 onto the personalized channel 128, such as by selecting a cell 130 in the grid. In addition, the user may select a control such as the "Add to My TV" control, where that control is associated with a program or episode.

The schedule grid 120 includes the personalized channel 128. The personalized channel 128 is presented near the top of the grid 120 and slightly separated from the other channels to indicate that its programs are specified by the user rather than by a media provider broadcast. The personalized channel can include multiple overlapping programs, and a user may be provided with various mechanisms with regard to watching and managing such programs. As one example, the programs may be displayed according to the times they are broadcast or are first made available for download. The user may then drag them later into time in the cell or cells for the personalized channel 128 so that they do not overlap, so as to "program" a viewing schedule that the user may later watch without having to select particular shows while watching. Programs that are shifted in time from their actual broadcast time may be recorded, such as by a PVR, and may be displayed according to the program the user has established. In this manner, a user can easily select programs to view, see whether the selected programs can be viewed when they are broadcast, and view the programs in a selected order as if they were live programs, but by time-shifting the programs in some selected manner.

The programs on the personalized channel 128 may include real-time broadcasts, delayed broadcasts, and prerecorded media content, including locally stored and streaming media content. For example, a user may elect to have all episodes of a broadcast situation comedy displayed in real time so as to get the full effect of traditional broadcast television (e.g., ability to discuss around the water cooler the next day at work, or watch sports live). Other programs may be played in almost real time, such as by scheduling a live sporting event and then another program, but then watching the other program on a 10 minute delay (while the program is being recorded) when the sporting event runs long (and perhaps catching up with the real time broadcast using a fast forward control). Stored media may also be used, such as to fill gaps in the other programming. For example, programs may be recorded when a user is not home, and may be entered into a programming schedule either manually by the user or automatically. Also, advertisements can also be inserted into programming. In addition, programming can continue if the user changes channels away from the personalized channel 128 while watching media programming, or can be continued as it would for regular broadcast television. By these mechanisms, a user establish a continuous or substantially continuous programming experience that "plays" much like broadcast television, but can be targeted to the user's interests.

A selected program cell 130 may be used to initiate an operation related to the program in other ways also, such as navigating to a display that presents more detailed information regarding the program. The details page 106 presents such detailed information. The details page 106 includes a program details area 132. The program details area 132 presents detailed information regarding the program, such as a genre of the program, a runtime length of the program, names of performers in the program, a content rating of the program, a quality rating of the program, and a synopsis of the program.

The program details area 132 also includes an upcoming episodes area 136. The upcoming episodes area 136 presents a list of the upcoming episodes for the program. The list may include detail information such as an episode title, a time for the showing, and a channel on which the showing is to occur.

The details page 106 also includes a search control 138. The search control 138 allows a user to input a search term to initiate a search for a particular program. The search may be limited just to a corpus of information associated with programming, or may be performed on an entire web page corpus, depending on a selection from the user. Various corpuses of information that may be searched, and the results displayed, are discussed in more detail below.

The details page 106 also includes an image details area 140. The image details area 140 presents images associated with the program, such as image result 140a. The image result 140a may be found by performing an Internet search for images related to the program, such as would be returned by the standard "Google Images" service. The search may be constrained in particular ways, such as by searching on a particular programming-related corpus of images or by adding certain terms, such as "television," to the query so that "Fred Thompson" returns images of the actor/politician and not of other people. Details including a snippet, image details, and a URL that displays the image, are also provide in image details area 140.

The details page 106 also includes a search details area 142. The search details area 142 may present the results of a search for web pages related to the program, such as a search result 142a. The search details area 142 may simply be a proxy of results that would be shown in response to a standard search for the episode name when applied to a full corpus or a corpus limited to programming related information. Controls may also be provided so that the user can access more episodes, more image results, more search results.

In operation, a user may initiate the program guide system 100 either by inputting a search term, such as "The Tonight Show," for a general web search using the search control 108 or a media programming search using the search control 138. In the case of the search control 108, the program guide system 100 presents the list 110 of programs related to the search term "The Tonight Show" within the search page 102 as part of a one box. Selecting a program in the list 110 directs the user to the landing page 104.

Alternatively, a user may input the search term for "The Tonight Show" using the media programming search control 138, such as is displayed on the landing page 104 or the details page 106. The search input directs the user to the landing page 104.

At the landing page 104, a user may direct the schedule grid 120 to a particular channel, time, and date by selecting a program from the groupings 116. The groupings 116 are programs determined using the search term "The Tonight Show." Each program grouping includes one or more episodes of that particular program. The user may navigate to groupings not currently presented using the additional results control 118. Selecting a particular episode in a program grouping directs the schedule grid 120 to a particular channel, time, and date. The user may also navigate through the schedule grid 120 manually using controls, such as the calendar 146 and the time bar 148. In addition, the user may "drag" the control up, down, left, or right similar in manner to moving a map in Google Maps, and cells in the grid may be added from a queue to be displayed, and additional cells may be fetched or pre-fetched, in the manner of fetching tiles around a display in Google Maps.

Such fetching of tiles may occur by various mechanisms. For example, the system may simply pre-fetch tiles that surround the area currently being displayed (within a certain number of tiles). Also, the fetching may proceed to fill in all channels at a currently displayed time, and then fetching information in the future or in the last direction of time-wise travel in a grid (e.g., if a user's last move was to the right, then future tiles will be fetched). This technique operates under the assumption that people are more likely to surf through channels than to look into the past or future. Under a third technique, the pre-fetching may approximate the momentum of the movement of the grid—much like air over the surface of a moving wing. More material is pre-fetched in the direction of motion (where there can be three dimensions: time, channel, and level of detail). Where motion is particularly fast, more material is fetched in the directed of motion and less to the sides of the grid. As a user's motion slows, more data in other dimensions away from the motion may be pre-fetched.

Regarding a third grid dimension for detail level, such a dimension may be implemented in various manners. In one such implementation, at a least detailed level, a program title and little more may be shown in a grid so as to permit maximum density of tile display. At a more detailed level, a rating and a short description of an episode may be shown. At a yet more detailed level, more detailed description may be shown, and an image may be shown. At a more detailed level, information duplicating or approaching that shown for the detail page 106 may be shown.

The user may navigate to the details page 106 for a particular program by selecting (e.g., clicking or double-clicking on) the program in the schedule grid 120, such as the selected program cell 130. At the details page 106, a user may view detailed information regarding the program in the program details area 132. The detailed information may be obtained, for example, from a structured database that organizes media content according to programs, actors, and other similar parameters and links the information in a relational manner.

The user may view images related to the program in the image details area 140. The images may be obtained from a structure database, such as a database associated with the detailed information, or may be obtained from disparate sources such as in the manner of Google Image Search. The user may navigate to an image by selecting an image result, such as the image result 140a.

The user may navigate to a web page related to the program by selecting a search result, such as the search result 142a, in the search details area 142. The user may also select an image in image details area 140 to have the image associated with the program. For example, the selected image may then be displayed in the details area 132 in place of the prior image, or a portion that is cut out of the image may be displayed in the grid 120, such as in cell 130, so that a user can make particular favorite programs more visible in the grid in a manner that the user can visually associate the cell 130 with the program (e.g., by selecting a logo or title associated with the program).

FIGS. 1A-1C show particular displays from FIG. 1 in more detail. FIG. 1A shows the search page 102. The search page 102 allows a user to search for web content using the search control 108. In the figure, the program guide system 100 has determined that the search term (e.g., "lost") may be a media program. For example, if the search term matched a media program name (such as a term stored in a "white list" of media-related terms) or the search term is included in a media program name, then the program guide system 100 may generate and present the list 110 of media programs.

Alternatively, or in addition, the search term may be another attribute of a media program, such as the program's channel, an actor in the program, or the program's format (e.g., drama or situation comedy). A user may also "force" a media search, such as by preceding a search term with a prefix such as "tv", "tv:", or "television." In addition to a name of a media program, the list 110 presents a time, date, and channel for the media program. The list 110 also indicates whether the particular presentation of the program is new or a repeat. The results in the list 110 may be ordered by relevance to the search term, whether the program presentation is new, and/or the date and time that the program is presented. A search may also be more readily assumed to be media-related if an identifier of a time range, a television network, an actor name, or other similar items are included in the search in addition to other media-related indicators.

The media icon 112 indicates that the list 110 presents media programs. The media icon 112 visually distinguishes the list 110 from general web page search results, such as web page search result 113. The search result 113 is also related to the search term "lost." The search result 113 includes a title that identifies the web page, a uniform resource locator (URL) to navigate to the web page, a link to a cached copy of the web page, a link to web pages similar to the web page, and a link to note the web page, such as in a personalized web notebook like Google Notebook. Noting the web page stores information about the web page in a web notebook associated with the user.

FIG. 1B shows the landing page 104 including the media result groupings 116 and the schedule grid 120. The groupings 116 present a list of programs matching a particular search term. The matching programs are selected from channels that are available to the user, such as from local broadcast or other media providers. A particular head-end associated with the user may also be associated with the displayed programs.

The location and media providers accessible by the user may be selected using the change location control 122. The change location control 122 will be described in more detail with respect to FIGS. 2A and 2B.

The schedule grid 120 presents the programs matching the search term as well as other programs occurring around the time of the matching program. Selecting a particular instance of a program (e.g., an episode or broadcast) in the media result groupings 116 moves the schedule grid 120 up or down to a channel associated with the program and left or right to a time associated with the program. This presents the program instance in the schedule grid 120. The schedule grid 120 may immediately present the selected program or may gradually present the program, such as by slowly scrolling to the grid location of the program.

In certain implementations, a user may select a program instance or episode in the schedule grid 120 to generate a new list of programs in the media result groupings 116 related to the selected schedule grid program. In such a situation, the selected program name or another program attribute may be submitted as a programming-directed search request to the system in generating a new landing page 104.

Programs in the schedule grid 120 that also appear in the groupings 116 are highlighted to indicate that they match the search criteria that generated the groupings 116. The highlighting may be, for example, a shading, color, grid cell size, or cell border thickness that differentiates the schedule grid programs satisfying the search condition from schedule grid programs that do not satisfy the search condition. In certain implementations, the shading, coloring, or sizing varies based on, for example, the closeness of the match between the search term and the program.

Alternatively, the shading, coloring, or sizing may vary with the degree of separation between programs matching the search term and programs related to the matching programs. For example, a user may input a search term such as "Star Trek II: The Wrath of Kahn." Instances of the movie "Star Trek II: The Wrath of Kahn" in the schedule grid 120 may be highlighted with a first highlighting that is more significant than subsequent highlighting (e.g., a bright color (red for close hits moving to blue for farther hits), dark shading, or large sizing). Instances of Star Trek movies other than "Star Trek II: The Wrath of Kahn" in the schedule grid 120, such as "Star Trek: The Motion Picture," "Star Trek III: The Search for Spock," "Star Trek IV: The Voyage Home," "Star Trek V: The Final Frontier," "Star Trek VI: The Undiscovered Country," "Star Trek: Generations," "Star Trek: First Contact,"

"Star Trek: Insurrection," and "Star Trek: Nemesis," may be highlighted with a second highlighting that is less significant than the first highlighting. The second highlighting indicates that the associated programs may not match the search term, but they are related to the programs that match the search term (e.g., they are other Star Trek movies). In addition, episodes of Star Trek series programs, such as "Star Trek: The Original Series," "Star Trek: The Animated Series," "Star Trek: The Next Generation," "Star Trek: Deep Space Nine," "Star Trek: Voyager," and "Star Trek: Enterprise," in the schedule grid 120 may be highlighted using a third highlighting that is less significant than the second highlighting. The third highlighting indicates that the Star Trek series programs may not match the search term and may not be the same type of media as the programs matching the search term (e.g., movies), but they are related to the programs through the Star Trek genre.

In another example, a user may input a search term for media programs having a particular actor or performer, such as "Leonard Nimoy." Media programs in the schedule grid that include the actor "Leonard Nimoy," such as "Star Trek: The Original Series," are highlighted with a first highlighting. Media programs having actors that have at some time performed with "Leonard Nimoy" are highlighted using a second highlighting. For example, episodes of "T. J. Hooker" and "Boston Legal" may be highlighted using the second highlighting as they include the actor William Shatner who starred with Leonard Nimoy in "Star Trek: The Original Series." However, episodes of "T. J. Hooker" in which Leonard Nimoy guest starred or directed may be highlighted using the first highlighting. The highlighting may also occur by placing images in the cells, so that programs involving Nimoy include a partial photographic portrait of Nimoy, and programs involving Shatner include a partial photographic portrait of Shatner.

In addition to highlighting programs matching the search terms in the schedule grid 120, the groupings 116 may also highlight the programs. The highlighting used in the groupings 116 may match the highlighting used in the schedule grid 120 for corresponding media programs. The groupings 116 may also present the media programs that are related to the media programs matching the search term.

The groupings themselves may also be highlighted, such as by including an image associated with each grouping as a watermark behind the grouping. Such an additional feature (not shown) may add decorative interest to the search results, and may also provide additional information to a user. For example, a user may have no idea what the text "Square Pegs" means, but when shown a photo that includes Jami Gertz, Tracy Nelson, and Sarah Jessica Parker, they may instantly recognize the iconic Emmy-nominated 1982 program about Weemawee high school.

The schedule grid 120 has an associated calendar control 146. The calendar control 146 includes tabs that allow a user to select a particular date or day of the week. Each tab includes hours of the day associated with the tab. Selecting a time interval in the tab directs the schedule grid 120 to present programs for the selected day and time interval.

The schedule grid 120 has a time bar 148 that indicates the times of day that programs in the schedule grid 120 are presented. The time bar 148 includes controls that allow a user to move to an earlier or later time or date. Alternatively, a user may move the schedule grid 120 by another method, such as by clicking on the grid 120 and dragging the grid 120 to a new time or date. The clicking and dragging may also move the grid 120 to present other channels. Alternatively, a user may use a control, such as a scroll bar, to move through the list of channels in the grid 120. As a user moves through times, dates, and channels in the grid 120, the landing page 104 may download data for channels and times/dates outside the periphery of the grid 120. This allows the grid 120 to present the programs for the channels and times that appear as a user moves the grid 120, without having to pause to download them.

The schedule grid 120 has an associated jump control 150 and an associated filter control 152. The jump control 150 allows a user to quickly move to the current time and date in the grid 120 or to a primetime (e.g., 8:00 PM) for the current day. The filter control 152 can be used to filter out various parts of the grid. For example, the filter may be used to show only prime time or late night programming, so that, for example, the grid jumps from 11:00 PM directly to 8:00 PM the next day. Likewise, the filter can be used to show only channels in a particular category, such as only movies channels or sports channels, or channels specifically selected by a user as their favorites channels.

The media results groupings 116 provide a compact area to view the results of the media programming search. Particularly, each grouping may present a number of programs that is less than the total number of programs in the grouping. For example, each grouping may represent a media program series and may present up to three episodes from the series. A program identifier 154 identifies the name of the series or grouping. The episodes or instances of the program are represented by schedule entries 156. A more control 158 indicates when more episodes or program instances exist that are not shown in the schedule entries 156. The more control 158 can also indicate how many more entries exist. A user may select the more control 158 to present the additional entries. In addition, a user may select the additional results control 118 to present additional groupings. The additional results control 118 indicates the number of additional pages of media results groupings. A user may select a particular page of media results groupings to be presented in the groupings 116.

When the landing page 104 is resized, for example as a result of a user input, the schedule grid 120 may be resized accordingly. The addition or subtraction of page space may be divided among the cells of the grid 120. The cells of the grid may have minimum and maximum sizes, such that if the minimum or maximum sizes of the cells are reached rows and/or columns may be removed or added, respectively, from the grid 120. The resizing, addition, and subtraction of cells in the grid 120 may be performed by a client-side script in a web browser, such as JavaScript.

Alternatively, or in addition (such as after the cells have reached a minimum size) the cells may be maintained in constant size and the grid 120 may have its channel and time dimensions shrunk or expanded as the window is decreased or increased in size respectively. Thus, for example, as the window is decreased in size, programs may be cut off in half-hour increments.

FIG. 1C shows the details page 106. As previously described, the details page 106 includes the program details area 132, the image details area 140, and the search details area 142. The program details area 132 shows a list 160 of actors associated with the presented program. A user may select an actor in the list 160 to initiate a search of media programming for the selected actor. The search may direct the user to the landing page 104. Alternatively, such a selection may obtain a details page associated with the actor, such as from the iMDB web site. Similar actions may be taken with respect to producers and others who might be associated with a program.

The program details area 132 includes actions 162a-c that may be performed using the program, such as by scheduling the program for recording to a PVR (162a), sending a link or other indicator for the program to a friend via electronic mail (162b), and to add an indicator for the program to a calendar, such as a Microsoft Outlook calendar (162c). The program details area 132 also includes information 166 associated with the program, such as an image from the program, the name of the series, the name of the episode, a synopsis of the episode, the date and time the program is scheduled for presentation, the channel presenting the program, the format of the program (e.g., a drama series), an indication of whether the program was previously presented or if it is a new episode, ratings information, and accessibility information. The information in the program details area 132 may be retrieved from web sites and services, such as a television/cable/satellite listings service and/or a movie/television information database.

The image details area 140 presents images and image information associated with the program. The images are retrieved by performing a search, for example, of the Internet, images previously retrieved form the internet, or another corpus, using the search term or other information associated with the program.

The search details area 142 presents web pages and web page information associated with the program. The web pages are retrieved by performing a search, for example, of the Internet using the search term or other information associated with the program.

Figure 1D:
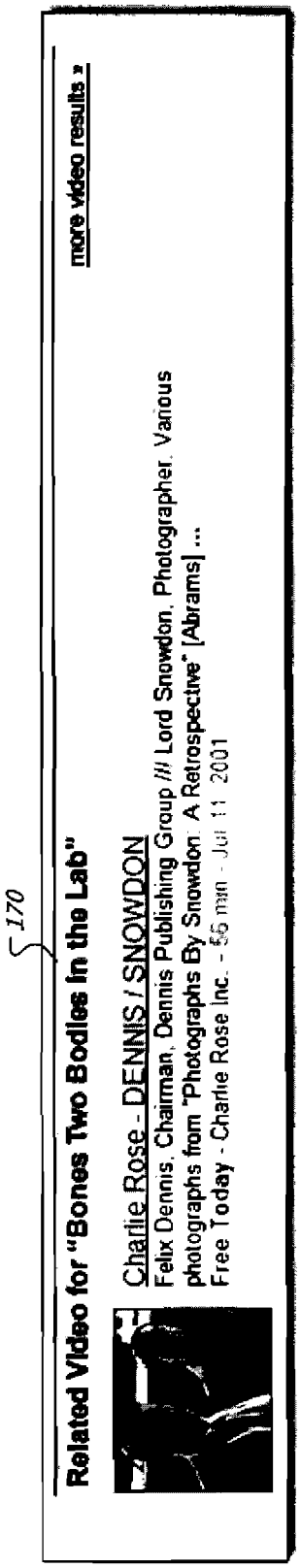
FIG. 1D shows an example videos detail display.

In addition, the details page 106 may include a video details area. FIG. 1D shows a video details area 170 that may be included in the details page 106. The video details area 170 may present a thumbnail image or sample frame or frames (e.g., a short clip) of the video and a link to where the video may be found. The video or videos associated with the program may be retrieved by performing a search, for example, of the Internet using the search term or other information associated with the program. The videos may include videos of other episodes of the program, or may include publicly made videos about the program, among other things. As one example, keywords may be associated with a program, either manually or by analysis of characteristics of the program and a transcript of the episode. Those keywords may be used to identify matching videos. For example, an episode of JAG may include extensive discussions of carrier landings, so that video details area 170 for that episode includes results of videos showing spectacular carrier landings.

A user may select one of the images 140a-d and be directed to a web page where the image may be found. In addition, the user may select one of the web page links 142a-c to be directed to the web page where a reference to the program was found. In certain implementations, the user may input a rating and/or comment for the program. Other users may then view the rating (or a composite rating form multiple users) and/or comment provided by the user, and may also filter results based on the rating.

In certain implementations, a user may customize the types of information presented in the details page 106, such as images, web pages, videos, or other media. For example, the user could indicate that only certain types of related information (e.g., only related images and videos, but not related to the web page results) should be shown in the details page.

Figure 2:
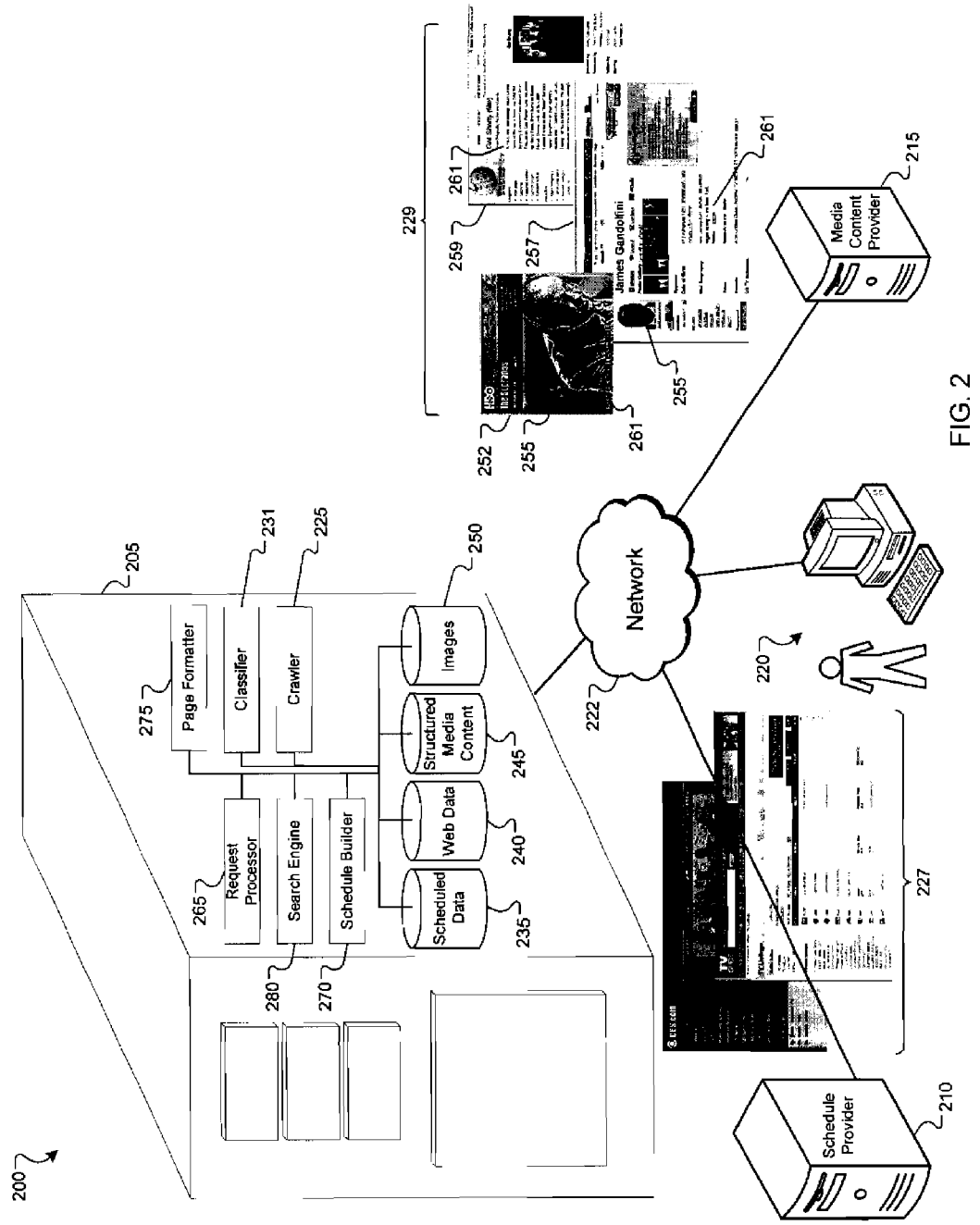
FIG. 2 is a block diagram of a system for displaying media content.

FIG. 2 is a block diagram of a system 200 for displaying requested programming content. In general, the system accesses both media-related and general content from a variety of independent sources, and can aggregate the information in various useful manners, such as is discussed above, for display to a user.

Overall, the system 200 can include a server 205 that can carry out the computational functions of processes described below. The server 205 may represent a single or multiple servers, including banks of servers in a computer data center. The system 200 can also include a schedule provider 210 that stores and provides media-related scheduling information and content. The schedule provider 210 may, for example, be a commercial provider of media programming information as discussed below. In addition, the system 200 may include a media content provider 215 that stores media-related information, such as in databases connecting programs with actors, and permit various media-related queries (e.g., similar to the Internet Movie Database system).

The system 200 may aggregate and generate content for provision to a user system 220. The content may originally come from schedule provider 210 and media content provider 215, among other things, and may be formatted by server 205 into a useful presentation for a user. The components of the system 200 can transfer and exchange information via a network 222, such as a local network or the internet.

The system 200 can be used to present media-related content to a user upon receiving a request for the media, such as in the form of a search query or the selection of a hyperlink. The system 200 can be operated and constructed such that, in a one implementation, when a user requests media-related content, server 205 already possesses the content, and does not need to gather the content. This configuration can considerably reduce the amount of time a user has to wait for the results of their search. The server 205 may also need to gather some or all of the content it needs to respond to a request The server 205 can execute programming instructions for seeking out programming schedule and media content, classifying this information, storing the information in a variety of contexts, and receiving and responding to search queries. Such information can be obtained from information providers, such as schedule provider 210 and media content provider 215 that make media-related content publicly available or available by contract or agreement with the operator of server 205.

The server 205 can also seek out media-related information using a crawler 225. The crawler 225 can be a program, for example, that seeks out media-related content from throughout the network 222 and retrieves the content for later storage. For example, the crawler 225 can access and retrieve the information from variety of sources including network websites. Such information can be generally unformatted, in that the content is not commonly defined in its format from one source to another.

A classifier module 231 can receive the information gathered by the crawler 225 and classify it according to certain criterion. For example, the crawler 225 may have found a new schedule 227 from an online schedule provider 210. The crawler module 225 can pass a link, i.e., the web address of the schedule 227 to the classifier module 231 so that it can initiate a download, or, alternatively, the crawler module 225 can initiate the transfer of the schedule 227, passing the actual information to the classifier module 231.

Upon receiving information from the crawler 225, the contents can be examined by the classifier 231 to determine their context. For example, the classifier module 231 can parse parts of an internet address to determine its origin and the type of information most likely to be retrieved. The web address http://www.imdb.com/title/tt0141842/ contains at least one identifier (imdb.com) that can be recognized by the classifier module 231 as information coming from the internet movie database website, a website known for its in-depth categorization of movies, television shows, etc. Therefore, the classifier module 231 may parse the contents of the retrieved web page into its constituents, which may include actor biographies, pictures, series information, and other related media content information.

Similarly, information received from the crawler 225 may contain recognizable computer code that allows the classifier module 231 to classify it as a certain type of information. In one embodiment, the retrieved information may contain html language including a table, with column and row headers labeled "time" and "channel" respectively, with a multitude of titles presented within the cell contents. Such a configuration may allow the classifier module 231 to categorize the information as a programming schedule and process it accordingly. In addition, images on web pages may be identified and may be classified for access via image search, but associated with text on the page for search purposes.

Classifier module 231 can store like information retrieved from the crawler 225 in repositories that catalog or organize the information by type. Furthermore, the classifier module 231 can parse the content received and store the information in appropriate repositories. The system 200 in FIG. 2 shows repositories for schedule data 235, web data 240, structured media content 245, and images 250, as examples of data that may be stored by the server 205.

The crawler 225 may find links on a webpage such as page 252 that lead to other web pages 257 containing biographies of the actors appearing on The Sopranos. Those web pages 257 can similarly contain text 261 and graphic elements 255 that the classifier module 231 can append to the data stored in the various repositories as explained for the previous web page 252. Category files can also be maintained locally that contain the local, physical address of the files within the repositories.

Crawler 225 can recognize and follow links to other online scheduling and media content sources found on schedules 227 or media content 229, thereby considerably expanding its "net" of retrievable schedules and content with every access. For example, an online programming schedule 227 from a network provider (e.g., www.nbc.com) may contain a link to another online programming source (e.g., www.tvguide.com), which may be in the form of an advertisement on the network webpage. In another example, the crawler 225 can follow a link from a media content provider 215 website that contains a link to a television programming schedule from an actor's biography.

Other information may be obtained directly as structure data from known information sources. Information retrieved from schedule provider 210 may include formatted information, in that the information is stored in a format that is defined by the schedule provider 210 and the format may be shared with the server 205 so that the server 205 may access and format the information in the manner intended by the schedule provider 210. Such information may be formatted as schedule data 227 that is passed from schedule provider 210 to server 205.

In addition to obtaining schedule data 227, the server 205 can also access and retrieve structured media content 229 from a media content provider 215. Media content 229 can include detailed information about a particular program, and is described in more detail below.

A request processor 265 can receive requests from users for detailed information about programming. This requests can originate, for example, from a user at a user system 220 viewing a programming schedule grid similar to the grid 120 shown in FIG. 1B. the schedule grid may be constructed using data from the schedule builder 270. For example, the user can view programming or content information surrounding the television show "Lost" as indicated by the highlighted box 130 in FIG. 1B. The information request can be initiated, for example, by clicking on the title of the show in the box 130. This action can send a request to the request processor 265 that includes information about the selected program, such as the program title, or a program identifier, that instructs the request processor 265 to match the request with contents of the system 200 repositories.

For example, a request for programming content surrounding the television show Lost may be received by the request processor 265 that includes the show title, or show ID, and may further include other identifying information surrounding the user's request, such as the show episode, or series information. The schedule builder 270, alone or in combination with a page formatter 275 (described below), can use this information in creating the display that the user can view.

Search engine 280 can receive search requests directly from users or via request processor 265. A user can initiate a search request by typing information in a search field such as field 138 shown in FIG. 1C. Alternatively, the server 205 can recognize the absence of requested programming content (schedules, media, etc.) for a particular program and initiate a search based on the entered query. The search engine 280 can store certain information relating to schedule providers 210 and media content providers 215 that provide a high probability of returning timely information about the requested program content. Also, the search engine 280 may be programmed to conduct separate searches (including by using different search techniques for each search) on multiple different corpora of documents to generate the results seen, e.g., in FIG. 1C.

The search engine 270 can also perform tasks related to searching the server 205 repositories, i.e., repositories 235, 240, 245, and 250, for requested programming content that has been stored previously. A user 220 may submit a request to view images that have been collected from various schedule providers 210 and media content providers 215 for one of their favorite television shows. For example, a fan of the television series "Baywatch" can request to see images of the show's stars. Search engine 280 may then search the images repository 250 (or an index associated with the repository 250) and other repositories for images that have been obtained by the crawler 225 and stored on the server 205. Similarly, a user can review program information such as the content of individual shows to get caught up on a television series by performing a search for the series information. Such content may be stored in the structured media content repository 245 or the schedule data repository 235.

The schedule builder 270 performs operations relating to providing the user with an intelligible programming schedule based on a request by the user. These operations can include the gathering of schedule information from the schedule data repository 235 or the search engine module 280 and arranging the information in a grid or other structured style so that the user can analyze it, for example, the times and channels that their requested program will air. Examples of the output of the schedule builder 270 can include the data to produce schedules 120 such as those shown in FIG. 1B, or lists of programming content such as that shown in FIG. 1C, e.g., list 136.

Schedule builder module 270 can parse the contents of schedules 227 provided by the schedule provider 210 to produce a customized schedule based on the user's request, or, it can present the schedules 227 as they were originally retrieved and stored. In certain embodiments, the schedule builder can provide links to, or the location of, media files, images, and other content that may correlate to an episode of a particular program. The page formatter module 275 can use this information for presenting the user with a schedule grid, for example, that contains media images within the cells that correspond to the episode. The schedule builder module 270 can generally collect the time, network, and/or channel of the program the user has requested to view, as well as any other useful information relating to the program and its schedule.

Page formatter 275 can generally perform the computing operations relating to receiving information from the request processor 265, search engine 280, and schedule builder 270, and generate mark up code for displaying the aggregated results for the user system 220. The page formatter 275 can perform the calculations necessary to incorporate media files and other visual elements into a schedule display that is of an appropriate size for the users computer 220 display. In addition to simply displaying the media content (schedules, media, links, etc.), web links can be provided so that a user can click on certain elements and be directed to other web content.

In addition, page formatter may be configured to permit personalization of the display of search results for media content. For example, a user may wish to only display certain fields (e.g., time and channel) for program results.

Figure 3:
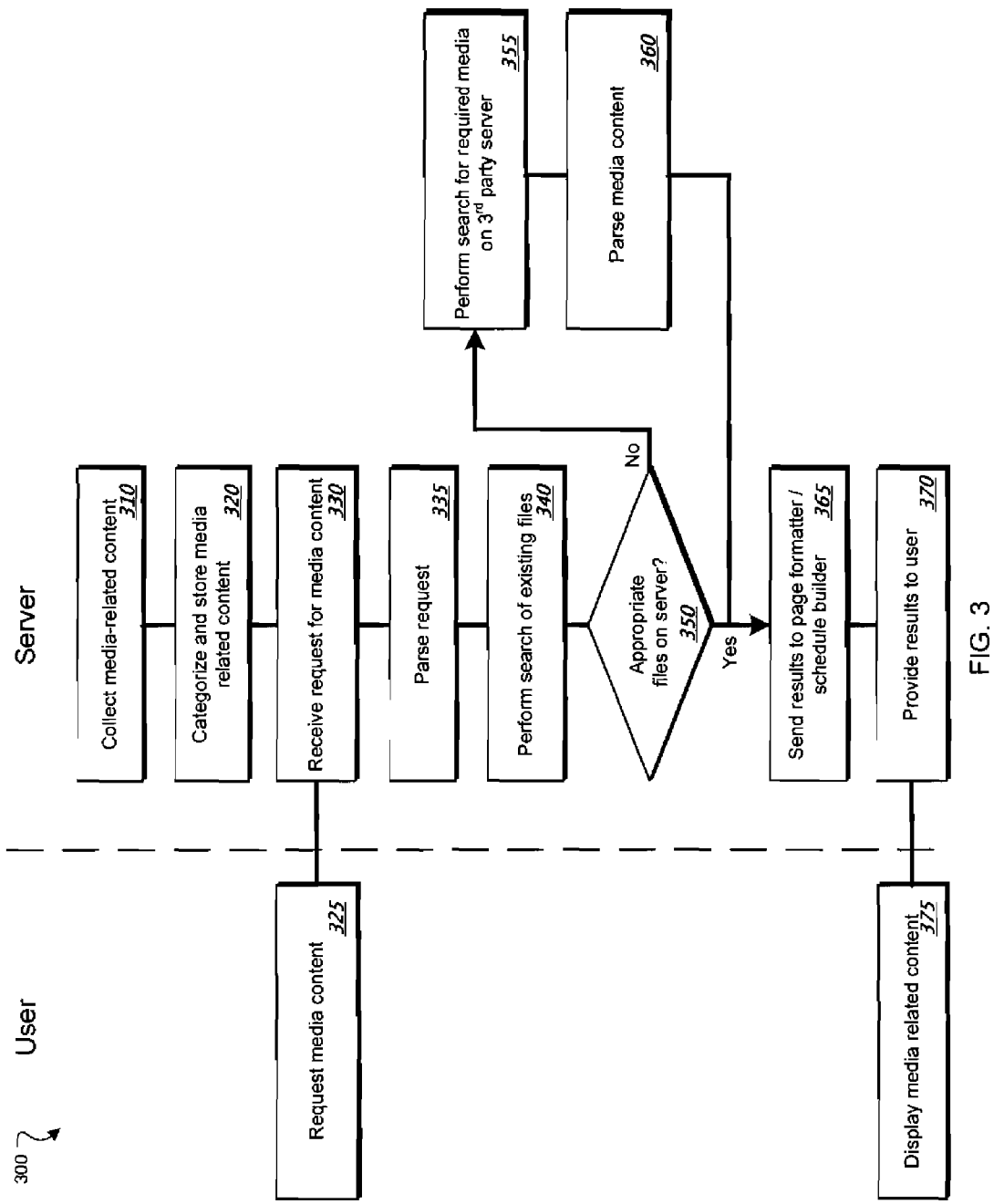
FIG. 3 is a swim-lane diagram showing actions for retrieving and displaying media-related content.

FIG. 3 is a swim-lane diagram showing actions for retrieving and displaying media-related content. In general, the three lanes of the diagram represent a client device (such as a television or computer being operated by a user), a server being accessed by the client device, and a third-party server providing information to the first server. The particular arrangement of the devices, and the operations performed by each, are provided for clarity, though the arrangement and operations of the various devices may also be altered in appropriate manners, and the particular implementation shown here should not be viewed as limiting.

In the process shown in the figure, media-related content is initially collected, such as from structure data providers and using a search engine, as discussed above. The system then categorizes and stored the content, such as by creating an index for the unstructured content by identifying words used in the content. The content may also be classified as being media related (box 320), and may, if so classified, be stored as a separate corpus, either by storage in a separate database or by flagging the content in a single database according to its corpora. For example, where a page includes the word "lost," that word is formatted in a prominent manner (e.g., it is defined to be part of a heading), the page includes information about a television network, or is linked directly or indirectly to known media-related sites, and the content includes references to media-related terms such as broadcast or show times.

The content (whether as the originally obtained content or an index generated from the content), once categorized, may be stored in repositories containing different corpora of content. For example, web pages may be stored with each other, although web pages having high indication that they relate to media can be stored in a separate subset of web pages. Other pages or pieces of content can be stored in one or more other repositories (or may be referenced from such repositories where they are stored elsewhere).

A user then requests programming content (box 325). The request can be in the form of a search query, such as by entering information in a search field, or it may be the result of a user-selected link from a program schedule or other selection, for example. At box 330, the system receives the user request for programming content. The request can be parsed (box 355) to determine the parameters of the request.

The server then searches the media-related content stored in the server repositories (box 340). At box 350, the server may determine whether it currently stores all of the information needed to return a result to the search query for the user. If it does, the process proceeds on. If it does not, it may access the needed information at run time, such as by sending a request—based on the request submitted by the user—to a third-party server such as a schedule information provider. The search or other request from the server may occur according to a prearranged protocol, such as by the server requesting programming data for a particular program or programming for a particular time period. The third party service may then transmit media content that is responsive to the request from the server (box 360).

The server may then aggregate the various content it has obtained, such as detailed descriptions of a program episode, scheduling information for the program, images from or about the program, web results using the program title as a query term, and other personalized searches for a user. A component of the server, such as a page formatter (box 365) may then access information about the user, if the user has taken steps to create a personalized media page, and may format the retrieved data into mark up code for displaying information such a in the form of the details page shown in FIG. 1C. With the code generated, the server may transmit the code to the client (box 370), and the client device may receive the code and generate or display a web page presenting the information (box 375).

Where the server provides customized results for the user, a user can set up a list of "favorites," i.e., a list of program content that the user wishes to view on more than one occasion. The user can transmit information from the user's system that identifies the user's preferences, including "favorites" so that the system can provide the user with programming content related to their favorite shows, for example. Such transmitted information can include cookies, or may be recognized when a user logs on to an account that stores information about the user on the server.

Figure 4:
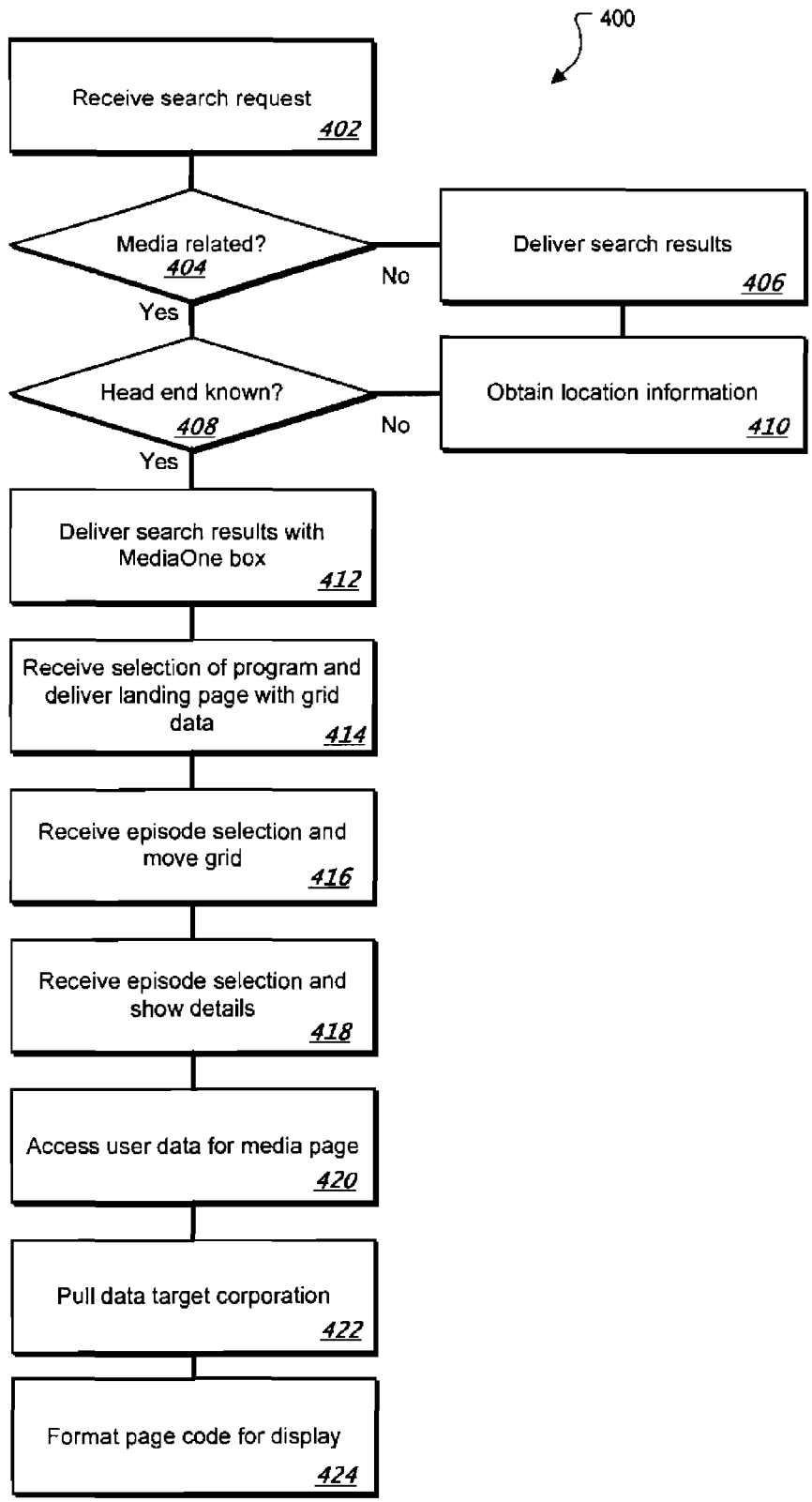
FIG. 4 is a flow chart showing actions for retrieving and displaying media-related content.

FIG. 4 is a flow chart showing actions for retrieving and displaying media-related content. In general, the chart 400 shows server-side actions made in response to actions by a user at a client who is browsing media programming information, such as in the screen shots shown in FIGS. 1 and 1A-D. At box 402, the system receives a search request, which may have been submitted through a search request box for a standard search engine. The system may first determine whether the request is media related (404), such as by comparing terms in the request with terms in a whitelist of media-related terms or concepts. Other similar determinations may be made on the request for similar purposes, e.g., for local search terms, weather-related terms, for shipping information (e.g., UPS and FedEx numbers), etc. If the request is not determined to be media related, basic search results may be delivered back to the user (box 406).

If the request is determined to be media-related, the system may then check to determine whether the user's head end or zip-code is known, such as by using a cookie or otherwise looking in a system-side database entry associated with the user. If the head end or zip-code for the user is not known, code for a display like that shown in FIG. 2A may be delivered to the client device of the user, and head end and/or zip-code can be determined by obtaining location information for the user (box 410).

Once head end and/or zip-code information is determined, the system may deliver search results to the user with a media One Box, similar to the display in FIG. 1A. After reviewing the results, the user may select a displayed program from the One Box, and the server may receive an indication of such a selection, and may generate code for a landing page like that shown in FIG. 1B. The code may include a list of search results organized in groupings or in some other manner, and code for generating an interactive grid, along with data for generating an initial display of the grid (e.g., around an episode for the top search result) (box 414).

Box 416 shows actions in response to a user's moving of the grid, such as by clicking on a cell and dragging it one way or another. Information about the display area for the grid may be provided to the system, such as by JavaScript running on the client, and a bounding box may be determined for cells displayed in the grid and those around the edge of the display. The relevant cell data may be retrieved and/or generated, and the system may provide additional data, such as in the form of XML data, to the client for filling in new cells in the grid.

Box 418 shows actions in response to a user's selection of a link for a particular episode. In such a situation, the system may deliver mark up code for a details page such as is shown in FIG. 1C. As discussed above, the system may use the submitted request to query a number of different corpora of media-related information so as to generated a number of distinct and different results that may be automatically aggregated with each other in a useful manner. At box 420, the system first determines whether a user associated with a request to show media information has been registered with the system to provide a customized view of media-related information. The system then pulls the data responsive to the request from multiple difference corpora, including as necessary, corpora stored locally in the system, and corpora reachable via third parties.

Applying standard formatting or formatting for the user that is identified in the user's data, the system may then present the code for display of the media details page (box 424). Specifically, the system may generate mark up code and transmit that code in an appropriate manner to the client device.

Figure 5:
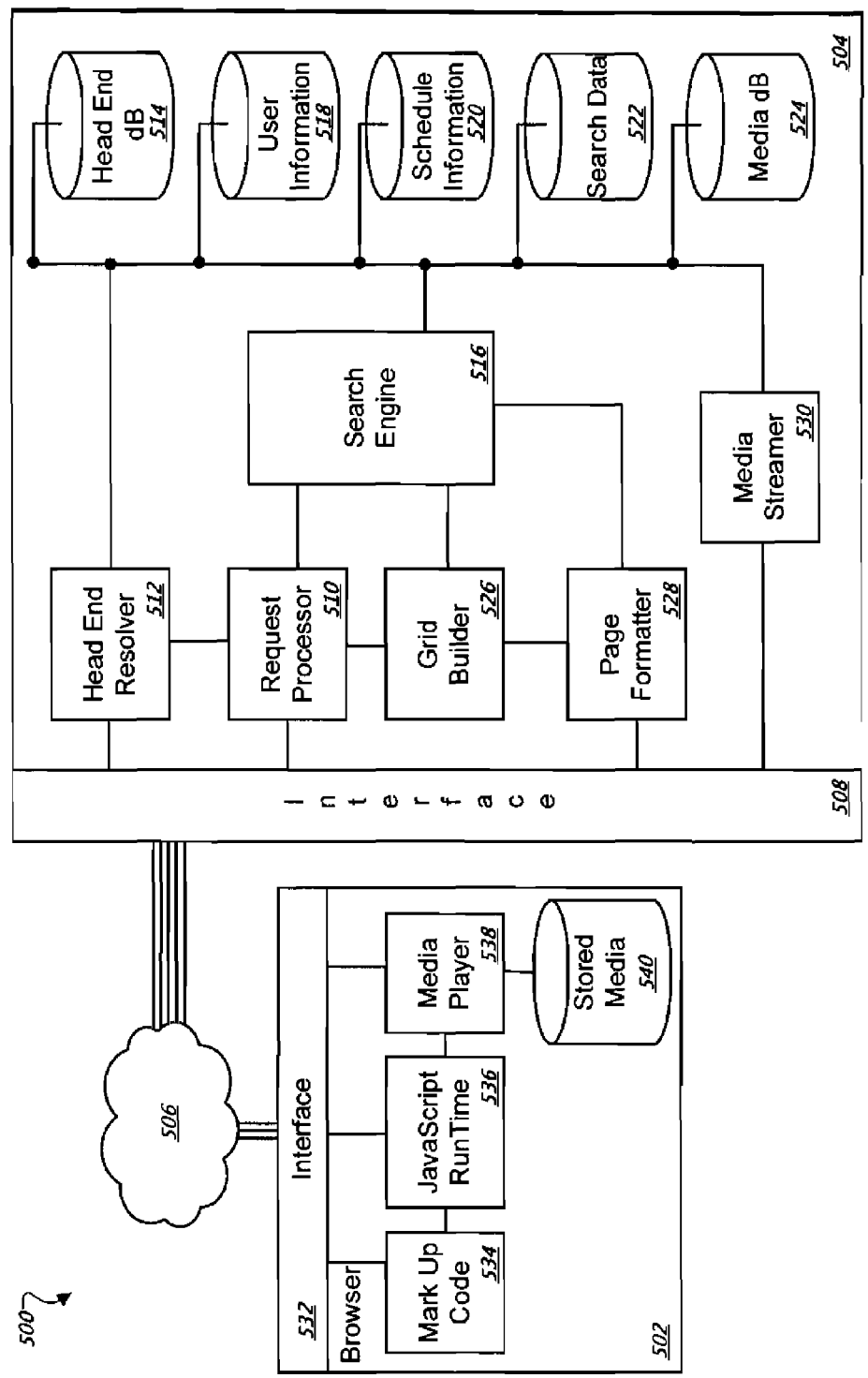
FIG. 5 is a schematic diagram of an example system for accessing media programming.

FIG. 5 is a schematic diagram of an example system 500 for accessing media programming. The system includes a client 502, a server 504, and a network 506, such as the internet, connecting the two. The server 504 may communicate through an interface 508, which may itself include or be part of one or more web servers. Media-related requests from the client may be identified by the interface and routed to the request processor 510. The request processor may parse the requests into their constituent parts to determine the sort of information requested by the client 502. For example, if the request is a media-related search request, the request processor may pass the search terms to search engine 516, which may return one or more search results in a conventional manner. Also, the search engine 516 may return a media one box, like those described above, where the request is determined to be media related.

Also, if a head end has not been associated with the client 502, a head end resolver 512 may be used to query the user for location information and other information (such as telecom provider) that may help in selecting a head end for the user with information stored in a head end database 514. A head end typically describes a particular source of programming for a user that is unique among various possible sources. Where a head end cannot be determined precisely but a reasonable number of head ends can be determined to be possible solutions, a generalized presentation covering all of the possible head ends may be provided. For example, for a particular row in a grid, a call sign (e.g., NBC, CBS, ABC, FOX, etc.) may be displayed, but without displaying a channel number (when that affiliate is displayed on different channels for different head ends) or by displaying both possible channel numbers (where two different providers might server the user from two different channels).

Where a user requests a landing page, grid builder 526 may provide code and generate data for display of a program grid at a particular date and time for a user. The grid builder 526 may receive signals, such as from search engine 516 regarding the position in the grid that is to be displayed on the client 502. Grid information and search information may be provided to a page formatter 528, which may generate code for the display of pages like those shown in FIGS. 1A-1D. The page formatter may also draw on other sources, such as image search results provided by search engine 516, and structured media data stored in media database 524. For example, relationships between and among actors and programs may be stored for display on a details page as shown above.

Various databases may also be accessed by system 500. For example, user information database 518 may contain personalized information about users. Such information may include, for example, favorite channels of the user, the content of the user's personalized channel and other information that may be used to generate custom displays like those shown in FIGS. 1A-D. The data may be accessed, for example, in response to requests from JavaScript running on the client, and may be supplied via XML or other format for use in an asynchronous fashion. Also, schedule information 520 may be provided, such as to grid builder 526, for display of programming information.

Media streamer 530 may be used where streaming media is provider by the system 500. The media streamer 530 may take any appropriate form and may be triggered based upon a display request from the client 502 when a particular program is set for display on the client 502.

Client 502 may communicate via interface 532. Interface 532 may include an interface for computer communications, such as an Ethernet interface connected to the network 506. Interface 532 may also include inputs for services such as OTA broadcast, cable, and/or satellite television reception. Various forms of broadcast media may be received through such mechanisms.

In the particular example, the client 502 interacts with a user through a web browser, though other applications may also be used to provide information to, and receive commands from, a user. Mark up code 534 on client 532 may be accessed by the browser and may cause displays like those shown and described above to be generated on the client 502. The mark up code may include XML and HTML, along with CSS for data formatting.

A JavaScript Runtime component 536 may also be provided and may permit for the operation of certain interactive features discussed above, such as movement of the program guide grid and fetching of grid tiles. The JavaScript runtime component 536 may execute code as part of an AJAX programming mechanism, to dynamically call the server 504 to obtain XML, HTML, and CSS information without having to leave or refresh a page such as the landing page 104.

Media player 538 may take various appropriate forms, and may include encoders and decoders for receiving, translating, saving, and playing audio/video content. Media player 538 may include, for example, components of Windows Media Player or other appropriate components, and may be control by selections by a user on the client, such as through a browser generating displays from mark up code 534. Media player 538 may render real time video and audio, and also lay out dynamic graphics such as Flash for real time embedded data (e.g., showing virtual baseball players on a diamond). Stored media 540 provides storage for programs, in a manner similar to that for standard personal video recorders. Media provided by media player 538 may be streamed over network 506, received from a broadcast source, or played from stored media 540.

Figure 6:
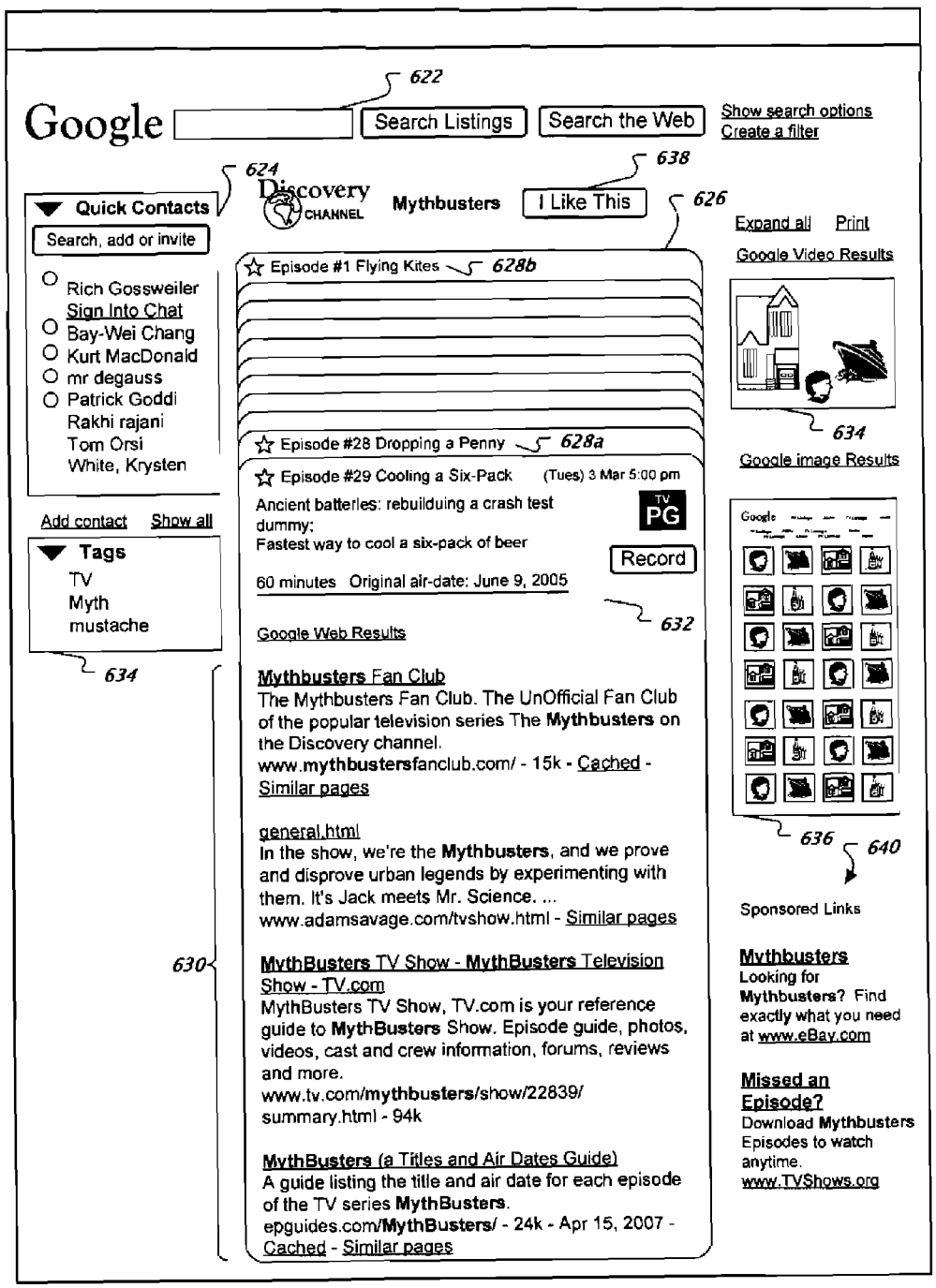
FIG. 6 is an example display of a media details page.

Referring to FIG. 6, there is shown a display 620 that is a portion of a media program search details page, which may be, in appropriate circumstances, an alternative form of display to that shown in FIG. 1C. In general, display 620 shows detailed results for a user and a program in a number of different areas, and shows information about particular episodes of a program on a series of visually stacked cards.

The display 620 includes a search control 622. The search control 622 may receive a search query, much like the standard Google search page. Queries submitted by the search control may be directed by the system to locating media-related content. That the query is related to media may be made known to the system in a variety of manners. For example, the code that generates display 620 may append a search term such as "tv:" in front of the query submitted by a user so that that term is added to the query and narrows the results returned for the query, or may be entered according to a format by which a search engine will use the prefix as a mechanism by which to limit the corpus of documents (e.g., web pages, images, and other information) that may be searched for the remainder of the query.

By submitting the query as a media-specific query, the user may be provided with results, like those shown in the rest of FIG. 6, that are specially formatted for displaying media information. In the example that is shown, those results include a contact list 624 for the user. The list 624 may be an instant messaging contact list that shows the current status of acquaintances of the user. The list may be used in a variety of manners, such as to send media identifiers to people on the list 624 that permit those people to acquire and watch a media program sent to them by the user. For example, selection of one or more people on the list accompanied by selection of a sharing control may cause a hyperlink or similar object to be electronically mailed or instant messaged to the selected people, so that their selection of the hyperlink causes the program to be displayed to them or causes the program to be added to a set of programming for those people, such as on their personalized channels, as discussed above.

A tags area 634 allows a user to see and edit tags associated with a media program. For example, the user may add tags that are adjectives or nouns that they believe are descriptive of the media program. As one example, a user may select a tag of "explosions" or "terrorist" for a particular episode of the Fox series 24. The tags may otherwise by managed and used in a standard manner for tagging of web-accessible content.

A card stack 626 is generated for the display 620 to represent multiple episodes of a particular program—here, Mythbusters from The Discovery Channel. Each card in the card stack 626 may represent an episode (or, e.g., for movies, a particular movie in a series or a particular movie in which an actor appears, as simple examples). Each card in the stack 626 may include a title such as titles 626a, 626b which may be made visible whether the particular card is on the top of the stack or not. The titles may be the title of movies, for example, or the titles that producers have given to each episode in a program series.

A displayed card may include a number of areas. As shown in the figure, an episode summary area 632 shows a synopsis for an episode and can also show information like that provided in details area 132 and information 166 of FIG. 1C. In addition, a parental rating for the program can be provided, as can a control that, when selected, causes a PVR associated with the system providing the display 620, to record the episode.

A search results area 630 can display various types of search results associated with the episode. Although web results are shown in the figure, other results, such as image, shopping, video, or other results may be shown. The web results may be generated, for example, by supplying the title of the program and key words from the episode title and/or tags for the episode, to a standard search engine. The search may apply across one or more corpuses, such as general web search, only across particular media-related web sites, or across other such groups of data.

A video search area 634 shows videos that may be available for viewing and that relate to the program and/or episode in some manner. For example, if the program is the Star Wars series of movies, and the episode is Return of the Jedi, the video search may return one of the Lego-based reenactments of the Star Wars movies that are available on the Web.

An image search area 636 may provide similar search result from a corpus including images, such as the Google Image Search service. The images may be filtered or otherwise directed to television, such that, for example, images of actor/politician Fred Thompson are shown, but images from the resume page of a lawyer in Newark that happens to be named Fred Thompson, are not.

An "I Like This" control 638 may be selected by a user to indicate that they like a particular episode that is shown. Such a selection may trigger a number of actions in a system that has generated display 620. For example, a profile associated with the user may be altered to reflect the preference. The profile or other information may be used to better present to the user program recommendations and relevant advertisements that the user may enjoy more than non-targeted programs and advertisements. Also, the user's relationships in a social network may be affected, such as by propagating information about the user's preference to profiles or other classification information for the user's acquaintances, or by notifying the acquaintances so that they can easily select the episode for viewing An advertisements area 640 may also be displayed, and may show various forms of advertisements targeted to the user and/or the program or episode. For example, characteristics of the user may be used for the targeting, as may content of the display 620 or of information sources that generated the content for display 620, such as by using analysis like that performed by the well-known Google Adsense service.

Figure 7:
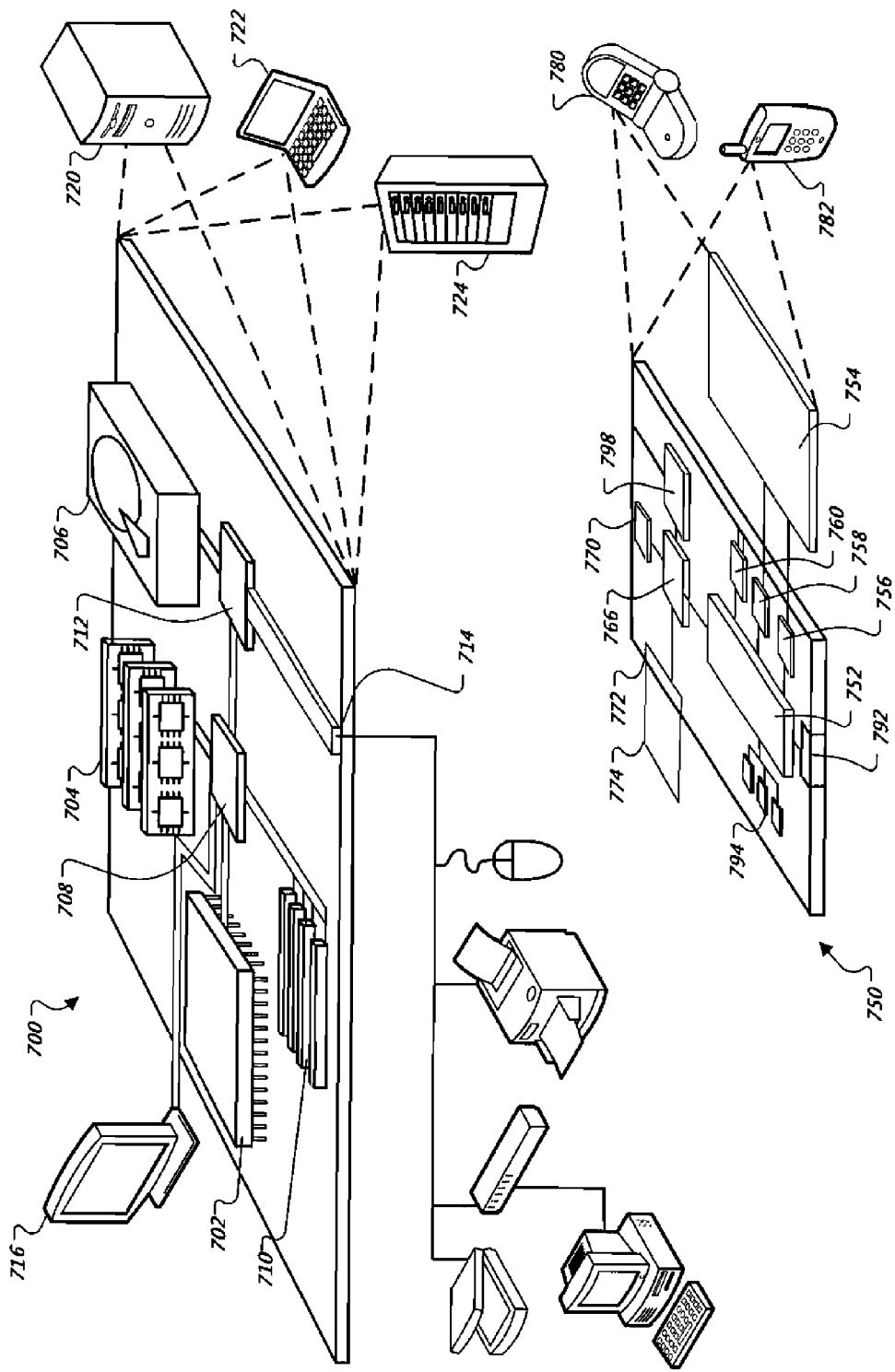
FIG. 7 is a block diagram of computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of what has been described. For example, the media content does not have to be restricted to "still" images. Live feeds from 3rd party server sources can be fed to the user 220 and incorporated into a programming schedule grid 120 or presented elsewhere on a display area 104. Accordingly, other embodiments are within the scope of the following claims.

What is claimed is:

1. A computer-implemented method, comprising:
  receiving at a server system from a client computing device a first search request;
  determining whether the first search request is or is not media-related; and
  in response to determining the first search request is media-related:
    identifying at the server system a media-related object responsive to the first search request;
    gathering from a plurality of different corpuses of information a plurality of search results associated with the media-related object, the plurality of search results including a listing of a plurality of episodes of a television program, a plurality of dates and times when one or more of the plurality of episodes will be presented, an overview of the television program, and web content retrieved from the internet that relates to the television program, wherein the web content that relates to the television program includes one or more images retrieved in response to performing a query corresponding to a second search request that is generated based at least in part on the first search request, the second search request indicating to the server system to search particular ones of the plurality of different corpuses;
  generating code that formats the plurality of search results for display together as a web page by the client computing device, the webpage including (i) a non-list area that includes information about a subject of the first and second search requests (ii) a search list area that includes links to landing pages that correspond to the subject, and (iii) an episode area that includes the plurality of dates and times when the multiple different showings of the television program will be presented, wherein the format of the search results on the web page is different if the search request is determined to be media-related than if the search request was not determined to be media-related; and
  providing the code to the client computing device;
  wherein the generated code includes code for displaying results from each of the plurality of different corpuses grouped together in an area of a display that is distinct from other areas of the display, including the listing of the plurality of episodes displayed grouped together and with a title, time, and channel associated with each episode, the overview of the television program displayed separately and the web content results displayed grouped together, and a selection by a user of the client computing device of a web content search result can navigate the user to a second web page related to the television program.

2. The method of claim 1, wherein the first search request is received at the client computing device from a user selection of a link associated with the media-related object.

3. The method of claim 1, wherein the plurality of different corpuses include a structured corpus and an unstructured corpus.

4. The method of claim 1, wherein the structured corpus includes information about a plurality of televisions programs or movies, and the unstructured corpus includes web content.

5. The method of claim 1, further comprising receiving from the client computing device one or more user commands to move a display of a group of search results, and generating code for displaying the display of the group of search results in an area indicated by the user commands.

6. A computer-implemented method, comprising:
receiving from a client computing device at a server system a first search request;
determining whether the first search request is or is not associated with a media program; and
in response to determining the first search request is associated with a media program:
submitting one or more queries that correspond to the first search request to one or more search engines addressing a plurality of search corpuses, wherein each corpus comprises a repository of information that includes media-related information and a separate search is conducted for each corpus, and receiving a plurality of results in response to the separate searches conducted for each of the plurality of search corpuses, wherein at least one of the queries corresponds to a second search request that is generated based at least in part on the first search request, to retrieve one or more images related to the media program, the second search request indicating to the server system to search particular ones of the plurality of different corpuses;
aggregating the results from the plurality of corpuses for simultaneous display in adjacent areas of a visual display, including identifying distinct areas in a user-configured display for groupings of results from each of the plurality of search corpuses and generating code for creating a web page showing a display of the groupings of results in the distinct areas, the distinct areas including (i) a non-list area that includes information about a subject of the one or more queries (ii) a search list area that includes links to landing pages that correspond to the subject of the one or more queries, and (iii) an episode area that includes a plurality of dates and times when multiple different showings of the media program will be presented, wherein a format of the web page is different than if the search request was determined to be not associated with a media program; and
providing the code to the client computing device.

7. The method of claim 6, wherein the query includes the first search request.

8. The method of claim 6, further comprising appending a media indicating term to the first search request to form the query.

9. The method of claim 7, wherein aggregating the results from the plurality of corpuses comprises associating an upcoming episode list of results with a first display area, a program summary with a second display area, and additional search results with one or more other display areas.

10. The method of claim 9, further comprising providing for a display of a program summary area, an images search result area, a web search result area, and an episode guide area.

11. A computer-implemented system, comprising:
one or more computing devices, including:
one or more memories including a plurality of separate databases each containing media-related information;
a search engine configured to receive a first search request, determine whether the first search request is or is not media-related, and in response to determining the first search request is media-related to generate one or more media-related queries to the plurality of separate databases, wherein at least one of the queries corresponds to a second search request that is generated based at least in part on the first search request, to retrieve one or more images related to the media program, the second search request indicating to the server system to search particular ones of the plurality of different corpuses; and
a page formatter including a search result aggregator for generating information for a display of multiple groups of search results from the plurality of separate databases, and wherein the page formatter configured to generate code that formats the multiple groups of search results for display as a web page, the webpage including (i) a non-list area that includes information about a subject of the first and second search requests (ii) a search list area that includes links to landing pages that correspond to the subject, and (iii) an episode area that includes a plurality of dates and times when multiple different showings of the media program will be presented;
in response to the search engine determining that the first search request is media-related, the format of the search results on the web page includes displaying results from each of the plurality of different databases grouped together in a distinct area of a display, including a plurality of episodes displayed grouped together and with a title, time and channel associated with each episode, an overview of the television program displayed separately and web content results displayed grouped together, and
a selection by a user of a web content search result can navigate the user to a second web page related to the television program.

12. The system of claim 11, wherein the request includes a media program name.

13. The system of claim 11, wherein the page formatter is further configured to generate mark up code for displaying the multiple groups of search results in a format that includes an upcoming episode listing for the program, and an overview of the program.

14. The system of claim 11, wherein the plurality of different corpuses include a structured corpus and an unstructured corpus.

15. The system of claim 14, wherein the structured corpus includes information about a plurality of televisions programs or movies, and the unstructured corpus includes web content.

* * * * *

UNITED STATES PATENT AND TRADEMARK OFFICE
CERTIFICATE OF CORRECTION

| | | |
|---|---|---|
| PATENT NO. | : 8,533,761 B1 | Page 1 of 1 |
| APPLICATION NO. | : 11/742148 | |
| DATED | : September 10, 2013 | |
| INVENTOR(S) | : Sahami et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 908 days.

Signed and Sealed this
Twenty-fourth Day of February, 2015

Michelle K. Lee
*Deputy Director of the United States Patent and Trademark Office*